(12) United States Patent
Egetoft

(10) Patent No.: US 7,810,084 B2
(45) Date of Patent: Oct. 5, 2010

(54) PARALLEL GENERATING OF BUNDLES OF DATA OBJECTS

(75) Inventor: Karsten S. Egetoft, Wiesloch (DE)

(73) Assignee: SAP AG, Walldorf (DE)

( * ) Notice: Subject to any disclaimer, the term of this patent is extended or adjusted under 35 U.S.C. 154(b) by 1161 days.

(21) Appl. No.: 11/444,451

(22) Filed: Jun. 1, 2006

(65) Prior Publication Data

US 2006/0282281 A1 Dec. 14, 2006

(30) Foreign Application Priority Data

Jun. 1, 2005 (EP) .................................. 05011833

(51) Int. Cl.
G06F 9/44 (2006.01)
G06F 9/45 (2006.01)
G06F 9/30 (2006.01)
G06F 9/40 (2006.01)

(52) U.S. Cl. ....................... 717/149; 717/119; 717/121; 717/153; 712/21; 712/203; 712/206; 712/215; 712/235

(58) Field of Classification Search ........................ None
See application file for complete search history.

(56) References Cited

U.S. PATENT DOCUMENTS

| | | | |
|---|---|---|---|
| 6,058,267 A * | 5/2000 | Kanai et al. ................... 712/28 |
| 7,254,590 B2 * | 8/2007 | Mudunuri et al. .................. 1/1 |
| 7,287,044 B2 * | 10/2007 | Wilmot .............................. 1/1 |
| 2002/0107957 A1 * | 8/2002 | Zargham et al. ............. 709/224 |
| 2005/0021745 A1 * | 1/2005 | Bookman et al. ........... 709/224 |

OTHER PUBLICATIONS

European Communication and Search Report, mailed Nov. 7, 2005 (3 pages).
Leinberger, William et al., "Multi-Capacity Bin Packing Algorithms with Applications to Job Scheduling Under Multiple Constraints," University of Minnesota, Computer Science and Engineering—Technical Report Abstract, No. 99-24, May 27, 1999, pp. 1-23.
Coffman, E.G. et al., "Approximation Algorithms for Bin Packing: A Survey," Approximation Algorithms for NP-Hard Problems, 1996, pp. 1-53.
Fiat, A. et al., "Online Algorithms: The State of the Art Passage," Lecture Notes in Computer Science, Springer Verlag, New York, NY, vol. 1442, 1998, pp. 147-195.
Maruyama, K. et al., "A General Packing Algorithm for Multidimensional Resource Requirements," International Journal of Information and Computer Sciences, Plenum Publishing Corporation, vol. 6, No. 2, Jun. 1977, pp. 131-149.

(Continued)

*Primary Examiner*—Tuan Q Dam
*Assistant Examiner*—Isaac T Tecklu
(74) *Attorney, Agent, or Firm*—Finnegan, Henderson, Farabow, Garrett & Dunner, LLP

(57) ABSTRACT

Computer-implemented methods, computer systems and computer program products are provided for parallel processing a plurality of data objects with a plurality of processors. As disclosed herein, the data objects to be assembled for further processing may be in bundles, the bundles obeying first predefined criteria, which is dynamically controlled by using a bundle specific master table. The methods and systems may generate pipelines of data objects by pre-selecting and grouping the data objects according to second predefined criteria by a first group of the plurality of processors, and create the bundles from each pipeline of the pre-selected data objects by a second group of the plurality of processors.

16 Claims, 2 Drawing Sheets

OTHER PUBLICATIONS

Aggarwal, Gagan et al., "The Load Rebalancing Problem," SPAA 2003 15th Annual ACM Symposium on Parallel Algorithms and Architectures, San Diego, CA, Jun. 7-9, 2003, Annual ACM Symposium on Parallel Algorithms and Architectures, New York, NY, Jun. 7, 2003, pp. 258-265.

Vaughan, John G., "Incorporating Job Sizes in Distributed Load Balancing," Microprocessing and Microprogramming, Elsevier Science Publishers, BV., Amsterdam, NL, vol. 41, No. 2, May 1995, pp. 111-119.

* cited by examiner

PARALLEL GENERATING OF BUNDLES OF DATA OBJECTS

FIELD

The present invention relates generally to the field of data processing and to the parallel processing a plurality of data objects. More particularly, the invention relates to real-time processing of the plurality of data objects, wherein the data objects have to be assembled in bundles. The invention also relates to systems and methods for processing such a plurality of data objects, as well as computer program products with a computer-readable medium and a computer program stored on the computer-readable medium that is suitable for carrying out such methods when the computer program is run on a computer or processor.

BACKGROUND

There exists many time critical processes which have to be processed in real-time and additionally in a very narrow time range. Those processes can be found, for example, in the field of processing transactions, which have to be performed by central IT-systems of a bank, for example. Those IT-systems, which are often based on real-time processing of data objects stored on a relational database, face a performance critical task if mass transactions have to be bundled due to different criteria or characteristics for further processing. The term "database" has many interpretations. One definition is a "collection of persistent data." A relational database is one in which the data consists of a "collection of tables related to each other through common values." The two most prominent characteristics of a relational database are: (1) data stored in tables, and (2) relationships between tables. A table (a.k.a. an entity or relation) is a collection of rows and columns. A row (a.k.a. a record or tuple) represents a collection of information about a separate item (e.g., a customer). A column (a.k.a. a field or attribute) represents the characteristics of an item (e.g., the customer's name or phone number). A relationship is a logical link between two tables. A relational database management system (RDBMS) uses matching values in multiple tables to relate the information in one table with the information in the other table. The presentation of data as tables is a logical construct; it is independent of the way the data is physically stored on disk. A master table contains permanent and dynamic information about entities, ledgers and subsidiary ledgers.

In order to achieve mass processing capabilities, such IT-systems use the technical possibility of dividing up single performance critical processes and, thus, running several processes in parallel on a plurality of processors. Such use of several processes in parallel enhances the overall performance only if the different processes are not working simultaneously on the same physical data objects on the relational database.

For parallel processing the mass transactions by a plurality of processors, it is useful to create independent working packages. Those working packages, in the following called "bundles," are created with respect to certain predefined characteristics, such as amount of payment, transaction code, or currency. The bundles themselves can further be subject to certain constraints. Those constraints can refer to a total number of transactions which can be bundled up in one single bundle or to a maximum sum of the amount of payment of all those transactions. Those constraints are dynamically controlled during the generation of a bundle by using a bundle specific master table containing master data of the bundle. A critical issue is based on the fact that as long as any one of the processors has access to the master table, the access is blocked for any further processor. Thus, the creation of a bundle can become a very time consuming object.

It is possible, for example, that single payment transactions have to be bundled due to criterias such as amount, currency, and transaction code and, each bundle must have exactly "1,000" transactions or a maximum sum of all transactions within the bundle of "1,000,000 EUR." In a IT-System where the processing of the single transactions is done using parallel processes, the system may have to find out for each transaction which bundle the transaction belongs to, and within the same process evaluate by accessing the master table if the bundle has already reached one of the criteria like maximum number of transactions or maximum total sum of transactions. This means, as already indicated, that several processes would access the same master table of the bundle in order to evaluate and update the information of number of transactions and total sum of the transactions in the bundle. All those parallel processes contribute when creating the bundle. Thus, from a performance point of view, the master table of each bundle to be created represents a bottleneck.

The scalability of a real-time IT-system working with such a traditional approach is limited as adding new parallel processes will not enhance the overall performance of the system in a linear way.

In the banking world today, most mass processing systems dealing with the requirement of bundling transactions due to different characteristics are running on mainframes. Here, the bundling is done via batch sorting the files into other files which then represent the bundles. There is no relational database involved and, therefore, there are no bottlenecks in the process.

However, in real-time processing, a relational database is indispensable. Therefore, it would be desirable to have a possibility to overcome the bottleneck caused by the master table of the bundle in case that a relational database is involved.

SUMMARY

In accordance with one embodiment, a method for parallel processing a plurality of data objects in a computer system is provided. The computer system may comprise a plurality of processors for processing the plurality of data objects. For further processing, the data objects may be assembled in bundles, the bundles obeying first predefined criteria, which is dynamically controlled by using a bundle specific master table. The method may comprise generating pipelines of data objects by pre-selecting and grouping the data objects according to second predefined criteria by a first group of the plurality of processors, and creating the bundles from each pipeline of the pre-selected data objects by a second group of the plurality of processors.

In accordance with another embodiment of the present invention, the data objects may be stored in a relational database. The bundling of those data objects may be dynamically recorded or written down in a bundle specific master table. Thus, the status of each bundle can be determined at any time. When the bundling is liable for predefined constraints, this may be dynamically controlled by using the bundle specific master table.

In case that there are several processors accessing the same bundles when assembling the data objects in those bundles, each of those processors needs to access the corresponding master tables. Because access to a master table can only be granted for one processor at the time, the processors may have to wait on each other. Therefore, according to one embodiment, a method is provided that divides the way of bundling the data objects into two separate steps, thus overcoming the bottleneck of a bundle specific master table. First, pipelines of data objects are generated by pre-selecting and grouping the data objects with respect to predefined criteria. This is done by a first group of the plurality of processors. Those pipelines form the basis for the following creation of the bundles. The data objects which are assembled in one bundle are then all originating from one and the same pipeline. Therefore, when bundling the data objects the processors are all operating with separate pipelines and separate bundles. When accessing the respective master tables of the bundles, there is no mutual blocking of the processors. The bundling process is decoupled.

In a further embodiment, the data objects can be chosen as bank transactions. Those bank transactions have a number of properties which all can serve as selection criteria for pre-selecting and grouping the bank transactions in pipelines. The bank transactions can be pre-selected, for example, according to their origin, their destination, or their transaction number.

In a further embodiment, the first predefined criteria, which have to be fulfilled by the bundles, can be chosen as size criteria of the bundles. That means, for example, that the number of data objects such as bank transactions which are assembled in one bundle is limited or fixed to a given number. It is possible, for example, that each bundle must have exactly "1,000" bank transactions. Furthermore, it is possible that a maximum sum of all transactions within a bundle is prescribed, for example, as "1,000,000 EUR."

After having generated the pipelines, all data objects such as bank transactions are assigned to exactly one pipeline, respectively. Each pipeline is handled or processed by exactly one processor of the second group of processors which is responsible to create bundles of data objects, such as bank transactions comprised therein.

A further embodiment of the present invention relates to a system for parallel processing a plurality of data objects, wherein the data objects are to be assembled for processing in bundles, the bundles obeying first predefined criteria, which is dynamically controlled by using a bundle specific master table. The system may comprise a plurality of processors for processing the plurality of data objects, wherein a first group of the plurality of processors is configured to generate pipelines of data objects by pre-selecting and grouping the data objects according to second predefined criteria, and a second group of the plurality of processors is configured to create the bundles from each pipeline of the pre-selected data objects separately.

Systems consistent with the invention can be configured to be used in real-time processing of the data objects. The data objects have to be assembled for further processing in bundles according to the first predefined criteria. Those criteria can correspond to size criteria of the bundles such as a fixed number of data objects comprised within one single bundle. This is controlled by use of the master table. The bundle specific master table records dynamically the status of the bundle. Therefore, the completion of each bundle can be derived from the entries in its master table.

It is possible that the data objects are bank transactions and that systems according to the present invention are integrated in an IT-system of a bank, for example. All time critical processing of transactions can be optimised by using systems consistent with aspects of the invention. The necessary bundling of transactions for further parallel processing of the transactions can be divided into two successive steps. The final determination of the bundles which is performed by the second group of processors is decoupled. Each processor is solely responsible for bundling the transactions which are grouped together in one single pipeline. Therefore, no processor cross the path of any other processor when determining the bundles.

Another embodiment of the present invention relates to a computer program with program code and program coding means, respectively, which are suitable for carrying out methods according to the present invention when the computer program is run on a computer.

Moreover, the present invention relates to a computer-readable medium with a computer program stored thereon, the computer program comprising program code and program coding means, respectively, which are suitable for carrying out methods according to the present invention when the computer program is run on a computer.

The present invention further relates to computer program products with an appropriate computer-readable medium.

Further features and embodiments of the invention will become apparent from the description and the accompanying drawings.

It is understood that both the foregoing general description and the following detailed description are exemplary and explanatory only and are not restrictive of the invention, as claimed.

BRIEF DESCRIPTION OF THE DRAWINGS

In the following, embodiments consistent with the invention will be described in greater detail by making reference to drawings in which.

DESCRIPTION OF THE EMBODIMENTS

Figure 1:
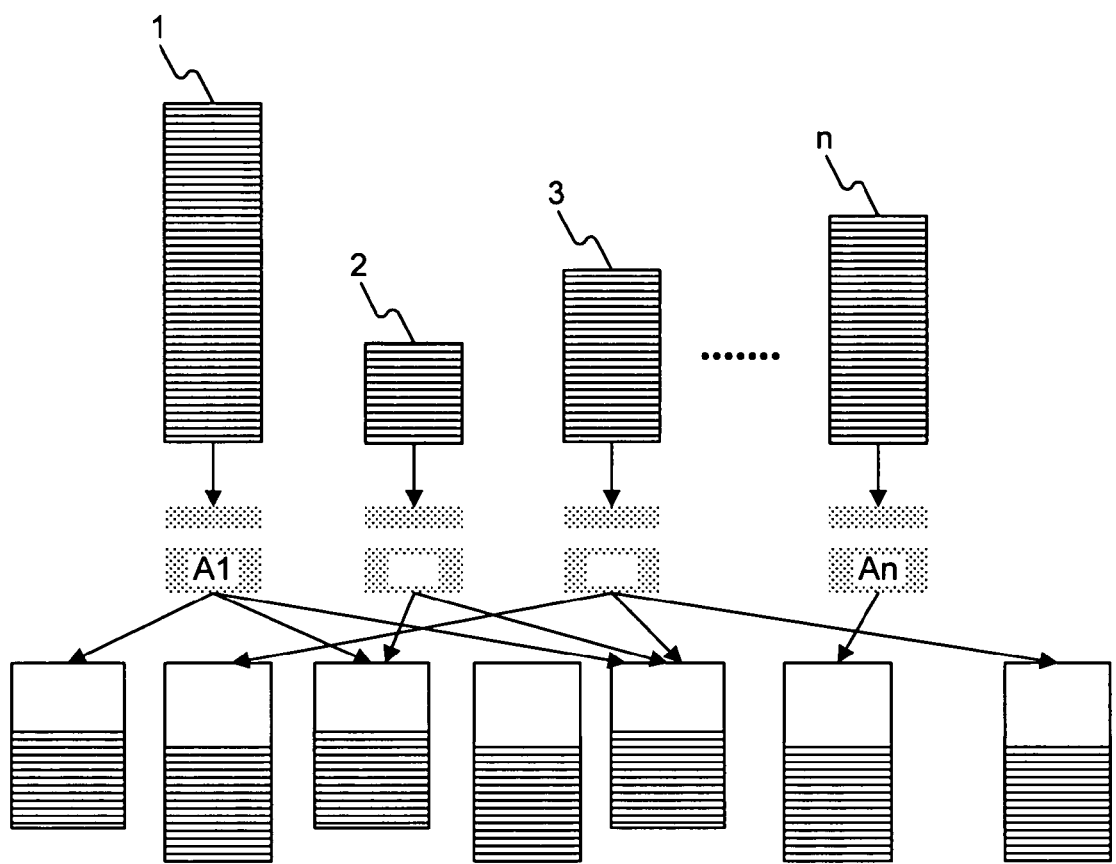
FIG. 1 is a schematic view of a traditional way of bundling data objects for further parallel processing.

FIG. 1 shows a possible course of bundling data objects as it is already known from conventional solutions. The bundling of data objects is explained by way of the example of bank transactions. There are "n" different so-called batch files "1" to "n," each comprising multiple transactions to be processed. Each batch file "1" to "n" consists of a list of transactions. A single transaction is described by a horizontal line. There are "n" processors "A1" to "An," each processor handling or processing one of the batch files "1" to "n." All those processors can be part of one single application server. The processors "A1" to "An" have to determine bundles of the transactions. It is possible that single payment transactions have to be bundled due to criteria, such as amount, currency and/or transaction code, which is further described below with respect to embodiments of the present specification as second predefined criteria. At the same time, each bundle has to obey further rules or criteria, referred to herein first predefined criteria. The number of transactions within one bundle can be fixed, for example, to exactly "1,000" transactions. It is also possible that the maximum sum of all transactions within one bundle may not exceed "1,000,000 EUR." In the system shown in FIG. 1, the processing of the single payments is done using parallel processes and the creation of the bundles is also done within the same processes, namely by the processors "A1" to "An." Therefore, each processor "Ai" will have to find out for each transaction of the batch file "i" which bundle "1-1," "1-2," "2-1," "3-1." . . . , "m-x" the transaction belongs to with respect to the second predefined criteria, and evaluate if the respective bundle has already reached one of the first predefined criteria such as maximum number of transactions or maximum total sum of transactions. Referring to a bundle "i," for example, it is possible that each batch file "1" to "n" comprises one or more transactions which belong to that bundle "i." Therefore, each processor "A1" to "An" which intends to access bundle "i" for adding a transaction listed within the batch file processed by the processor has to access a master table of bundle "i" for controlling whether bundle "i" is already terminated or still can receive any further transaction. During the access of any one of the processors, no further processor is allowed to access the bundle specific master table. The master table is blocked for further access. This results in a time consuming procedure when bundling the transactions in bundles "1-1," "1-2," "2-1," "3-1," . . . , "m-x" with respect to the first and second predefined criteria. In such a scenario, the master tables of the bundles represent a bottleneck.

Figure 2:
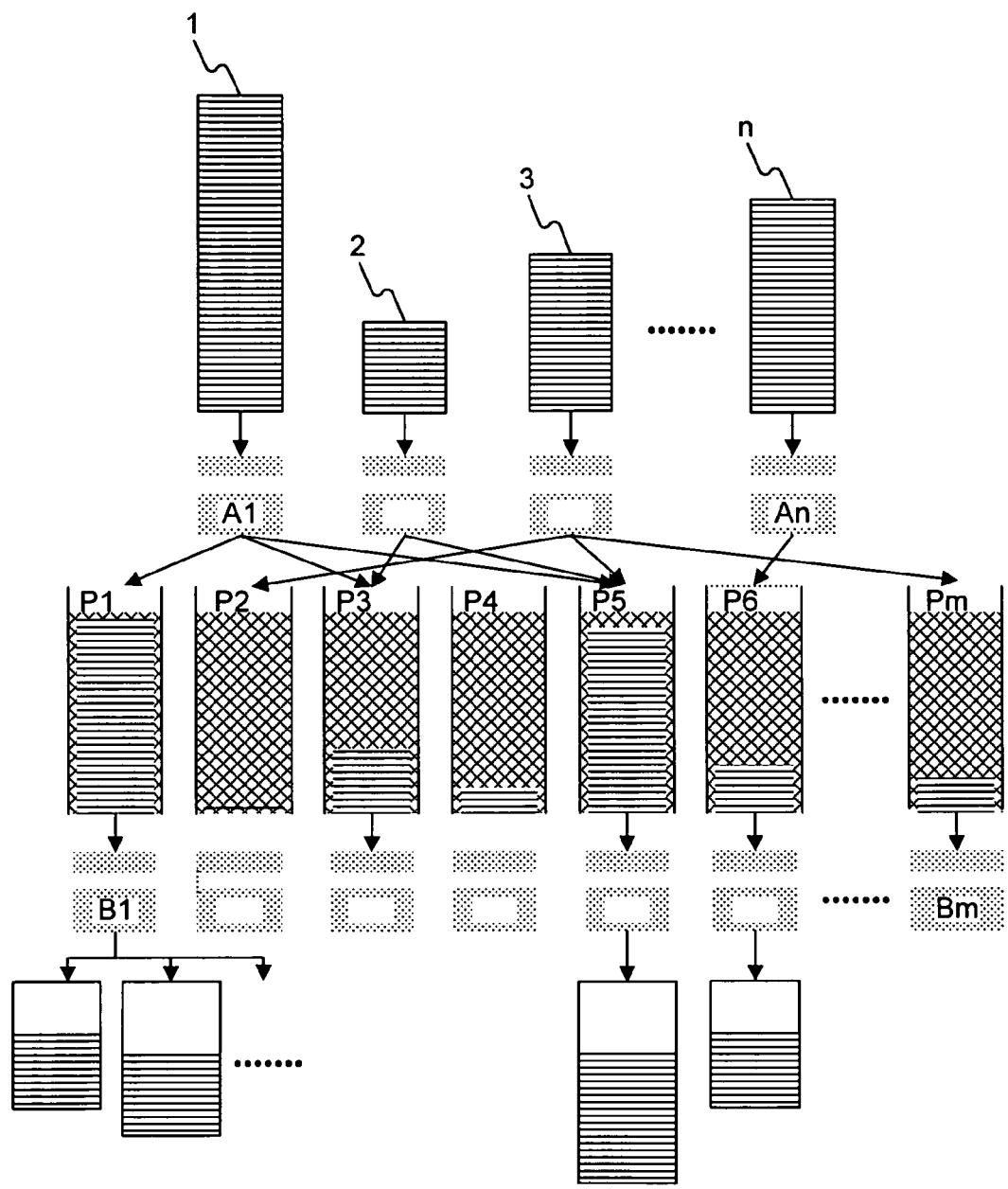
FIG. 2 is a schematic view of an exemplary method of bundling data objects, consistent with an embodiment of the present invention.

FIG. 2 shows an exemplary course of bundling transactions with regard to first and second predefined criteria, consistent with an embodiment of the present invention. The bundling of data objects is again explained by way of the example of bank transactions. There are "n" different batch files "1" to "n," each comprising multiple transactions to be processed. Each batch file "1" to "n" consists of a list of transactions. As in FIG. 1, a single transaction is described by a horizontal line. There are a first and a second group of processors. A first group of processors comprises n processors "A1" to "An," each processor handling or processing one of the batch files "1" to "n." All those processors can be part of one single application server. The first and second group of processors can be physically identical, but processing at two different levels as it would be with physically separated groups of processors. The final aim is to generate bundles of the transactions. However, the bundling of transactions is here, in contrast to the scenario described in FIG. 1, divided into two separate steps. In a first step, the processors "A1" to "An" have to determine or generate pipelines of the transactions. It is possible, as already indicated in FIG. 1, that single payment transactions have to be bundled due to criteria, such as amount, currency and/or transaction code, which is referred to herein as second predefined criteria. Therefore, the transactions are pre-selected by the first group of processors "A1" to "An" with respect to those second predefined criteria and accordingly grouped in pipelines P1 to Pm. Each pipeline comprises all transactions obeying one or more of the predefined second criteria.

At the same time, each final bundle has to obey further rules or criteria, referred to herein as first predefined criteria. The number of transactions within one bundle can be fixed, for example, to exactly "1,000 transactions." It is also possible that the maximum sum of all transactions within one bundle may not exceed "1,000,000 EUR." In the system shown in FIG. 2, the processing of the generated pipelines is done using parallel processes and the creation of the bundles is done within the same processes, namely by the second group of processors B1 to Bm. Each pipeline P1 to Pm is assigned to and processed by exactly one processor B1 to Bm and each processor B1 to Bm is responsible for only one pipeline P1 to Pm. Therefore, contrary to the solution in FIG. 1, a processor Bi processing pipeline "Pi" already "knows" for each transaction of the pipeline "Pi" which bundle the transaction belongs to with respect to the second predefined criteria because the transactions are already pre-selected with respect to those criteria. Only processor "Bi" determines bundles "i-1" to "i-x," which are all composed of transactions of pipeline "Pi." When processor "Bi" evaluates if the respective bundle "i-1" to "i-x" has already reached one of the first predefined criteria, such as maximum number of transactions or maximum total sum of transactions, processor "Bi" also has to access the respective master table. However, there is no other processor of the second group of processors which intends to access a master table of one of the bundles "i-1" to "i-x" at the same time. Therefore, due to the pre-selection of the transactions resulting in the pipelines "P1" to "Pm," each processor "B1" to "Bm" can operate separately and independently from any other processor, particularly when accessing one of the bundle specific master tables of any bundle assigned to the respective processor. No mutual blocking of any master table can occur. This results in a time optimized procedure when bundling the transactions in bundles "1-1," "1-2," "2-1," "3-1," . . . , "m-x" with respect to the first and second predefined criteria.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method for parallel processing a plurality of data objects in a computer system comprising a plurality of processors for processing the plurality of data objects, wherein the data objects to be assembled for further processing are in bundles, the bundles obeying first predefined criteria, which is dynamically controlled by using a bundle specific master table, the method comprising:

generating pipelines of data objects by pre-selecting and grouping the data objects according to second predefined criteria by a first group of the plurality of processors; and creating the bundles from each pipeline of the pre-selected data objects by a second group of the plurality of processors, wherein the creation of bundles from each pipeline is performed independently of all other pipelines.

2. The method according to claim 1, wherein the data objects are stored in a relational database.

3. The method according to claim 1, wherein the method is used for a real-time processing of the data objects.

4. The method according to claim 1, wherein the data objects are chosen as bank transactions.

5. The method according to claim 1, wherein the first predefined criteria are chosen as size criteria of the bundles.

6. The method according to claim 1, wherein at least one of the first group of processors and the second group of processors are incorporated in one single application server of the computer system.

7. A system for parallel processing a plurality of data objects, wherein the data objects to be assembled for processing are in bundles, the bundles obeying first predefined criteria, which is dynamically controlled by using a bundle specific master table, the system comprising:

a plurality of processors for processing the plurality of data objects, wherein a first group of the plurality of processors is configured to generate pipelines of data objects by pre-selecting and grouping the data objects according to second predefined criteria, and a second group of the plurality of processors is configured to create the bundles from each pipeline of the pre-selected data objects independently of all other pipelines.

8. The system according to claim 7, wherein the data objects are stored in a relational database.

9. The system according to claim 7, wherein the system is configured to be used for a real-time processing of the data objects.

10. The system according to claim 7, wherein the data objects are bank transactions.

11. The system according to claim 7, wherein the first predefined criteria are size criteria of the bundles.

12. A computer-readable physical storage medium with a computer program stored thereon, the computer program comprising instructions operable to cause a method for parallel processing a plurality of data objects to be performed in a computer system comprising a plurality of processors for processing the plurality of data objects, wherein the data objects to be assembled for further processing are in bundles, the bundles obeying first predefined criteria, which is dynamically controlled by using a bundle specific master table, the method comprising:

generating pipelines of data objects by pre-selecting and grouping the data objects according to second predefined criteria by a first group of the plurality of processors; and creating the bundles from each pipeline of the pre-selected data objects by a second group of the plurality of processors, wherein the creation of bundles from each pipeline is performed independently of all other pipelines.

13. The computer-readable medium of claim 12, wherein the data objects are stored in a relational database.

14. The computer-readable medium of claim 12, wherein the method is used for a real-time processing of the data objects.

15. The computer-readable medium of claim 12, wherein the data objects are chosen as bank transactions.

16. The computer-readable medium of claim 12, wherein the first predefined criteria are chosen as size criteria of the bundles.

* * * * *